United States Patent Office 2,997,423
Patented Aug. 22, 1961

2,997,423
METHOD OF MAKING A COMPOSITION OF SODIUM CARBOXYMETHYL DEXTRAN AND AN ANTIBIOTIC
Leo J. Novak, Dayton, Ohio, assignor to The Commonwealth Engineering Company of Ohio, Dayton, Ohio
No Drawing. Filed Apr. 20, 1959, Ser. No. 807,294
3 Claims. (Cl. 167—82)

This invention relates to biochemical powders, and more particularly to a free-flowing dusting powder composed of carboxyalkyl dextran and an active ingredient for destroying or inhibiting the growth of microorganisms.

The invention is of broad application, the product being adapted to be applied as a germicidal dusting powder to animals, humans and plants, to inhibit or destroy undesirable microorganisms and bacteria.

In my prior U.S. Patent No. 2,786,011 there is described certain pesticidal compositions consisting essentially of an aqueous dispersion of carboxymethyl dextran or alkali metal salts thereof and an active pesticide. Such compositions differ distinctly from the free-flowing powder compositions of the present invention.

Dusting powders having improved mobility and absorptive power have been described in U.S. Patent No. 2,876,165, but the compositions are not of germicidal character, and to which the present invention relates.

Various insecticidal dust-like compositions have been utilized heretofore to apply toxic substances in a dry state to plants and animals. These products, however, are relatively immobile, and tend to cake and are difficult to dispense from containers or spray equipment.

It is accordingly an object of the present invention to provide a free-flowing chemical powder of the character described which does not lose its free-flowing properties on exposure to normal or high humidity atmospheric conditions and which can be readily applied to the surface to be treated.

A further object is to provide a germicidal powder material which can be applied to plants and animals in a dry dust-particle condition, and which upon application will adhere to the surface to which it is applied and not be washed away readily.

A further object of the invention is to provide a stable, powder containing an active ingredient, e.g., germicide, fungicide, bactericide or antibiotic and which is carried by particles of carboxyalkyl dextran to form a free-flowing powder.

These and other objects and advantages of the composition will become apparent from the following description and wherein the invention will be described with more particularity with respect to the preparation of free-flowing powder compositions containing carboxymethyl dextran and bactericidal or antibiotic substances.

In the present invention the active bactericidal or germicidal substance is admixed with and ground to a finely divided solid state with carboxymethyl dextran or alkaline metal salt thereof. The particle size of the dextran derivative has an average diameter of 40–300 microns, and preferably between 50 and 100 microns.

The metal salts of the carboxymethyl dextran which are useful as a carrier for the bactericidal constituents include alkali metal salts of the carboxyalkyl dextran, such as sodium, potassium, lithium, alkali earth metal salts, for example, calcium, strontium, and ammonium salt. Such dextran derivative carboxyalkyl compounds or their salts may be suitably prepared by reacting dextran in native condition with an excess of a carboxymethylating agent, for example, sodium or potassium chloracetate in aqueous solution or dispersion, and containing an excess of an alkali metal hydroxide such as sodium or potassium hydroxide at 50° C. to 100° C. for ten minutes to two hours, under conditions such that the molar ratio of sodium or potassium chloracetate to dextran is between 2:1 and 12:1. The molar ratio of sodium or potassium hydroxide to dextran is between 5:1 and 15:1, and the molar ratio of water to dextran is between 70:1 and 120:1, the reaction product is a viscous mass comprising the alkali metal salt of a carboxymethyl dextran having a D.S. (degree of substitution or average number of carboxymethyl groups per anhydroglucopyranosidic unit) of less than 1.0, usually 0.2 up to 3.0, which salt can be precipitated by the addition of a water-miscible alcohol or ketone such as methanol, ethanol, propanol, isopropanol, t-butanol or acetone to the crude reaction mass.

To obtain a powder, the alkali metal salt of the carboxymethyl dextran produced as described is ground or pulverized in any suitable device, such as a micropulverizer or micronizer, to obtain a finely divided material having an average particle size of 40 to 300 microns, preferably 40 to 100 microns.

Alkaline earth metal salts of the ether, and the ammonium salt thereof, may be obtained by recovering the free ether from the alkali metal salt and then reacting it in aqueous medium, with the appropriate base to obtain the desired alkaline earth metal or ammonium salt.

The free carboxymethyl dextran may be recovered from the alkali metal salt by mixing the latter with water, acidifying to pH 2.0, and precipitating the ether by means of a water-miscible alcohol or ketone. The pH of 2.0 is not critical and the ether may be precipitated at other acid pH values. However, the highest yields of the free ether have been obtained by precipitation thereof at pH 2.0.

The pH of the moist human skin is usually below 7.0, that is on the acid side and therefore, particularly when the powder material is to be applied to excessively perspiring skin surfaces, it is desirable to use a powder that, in contact with the moisture of the skin, has a pH which is neutral or on the alkaline side. In this way the acid skin surface is neutralized or made alkaline, and irritation of the skin is thereby avoided. Dusting powders comprising a partial or complete salt of the ether generally have a pH at the neutral point or on the alkaline side when exposed to the moisture of the skin. The partial salts are usually obtained when the reaction of the carboxymethyl dextran and base is effected at pH 7.0, resulting in partial neutralization of the acidic ether, whereas the complete salts result when the reaction is carried out at alkaline pH of, say, 8 to 11, using an excess of the base to insure complete neutralization of the ether.

The dextran carboxymethylated may be obtained by the action of microorganisms of the *Leuconostoc mesenteroides* or *L. dextranicum* types (or their enzymes) on sucrose. The procedure is to inoculate an aqueous sucrose-bearing nutrient medium containing appropriate inorganic salts and nitrogenous materials with a culture of the microorganism, or with the enzyme filtered from the culture, and incubate the mass until the dextran is produced in maximum yield, after which it is precipitated by the addition of a water-miscible aliphatic alcohol or ketone. Microorganisms which may be used include those bearing the following NRRL (Northern Regional Research Laboratory) designations: *Leuconostoc mesenteroides* B–512, B–119, B–1146, B–1190, B–742, B–1191, B–1196, B–1208, B–1216, B–1120, B–1144, B–523; *Streptobacterium dextranicum* B–1254 and *Betabacterium vermiforme* B–1139, which synthesize a native dextran normally having a high molecular weight which may be in the millions and which may be water-soluble or substantially insoluble in water, depending on the microorganism used.

Carboxymethyl ethers of the water-soluble or water-dispersible native dextrans such as that obtained using the microorganisms L.m. B–512, L.m. B–1146, and *Streptobacterium dextranicum* B–1254, and especially those ethers having an average D.S. with respect to carboxymethyl groups of 2.0 to 3.0, exhibit maximum hydrophilic property in the free ether form. These free ethers are acid and generally powders consisting thereof are not desirable when the powder product is to be applied on the skin, and are preferably converted to the partial or complete salt for such uses. The hydrophilic property of the ether is modified by conversion to the salt and, therefore, depends on whether the ether is partially or completely neutralized in the salt forming reaction. The carboxymethyl ethers of the water-insoluble native dextrans, of which that obtained using the microorganisms L.m. B–523 or its enzyme is the prototype, especially those ethers containing an average of 2.0 to 3.0 carboxymethyl groups per anhydroglucopyranosidic unit, are less hydrophilic than the salts thereof and therefore can be rendered hydrophilic by conversion to the salt and to a degree depending on whether the ether is partially or completely neutralized with production of a partial or complete salt. It is thus possible to impart a controlled moisture pick-up and retention capacity to the ethers derived from the normally water-insoluble native dextrans by conversion of the ether to the salt.

The dextran ethers and salts need not be derived from the native, unhydrolyzed high molecular weight dextran inasmuch as native dextran may be partially hydrolyzed to a lower molecular weight between the initial weight and 5,000, prior to conversion to the ether and salt thereof. In general, the starting dextran may have a molecular weight of 5,000 to $150 \times 10^6$ determined by light scattering measurements. This also affords a means of controlling the hydrophilic property of the dusting powder, since the hydrolyzed dextran is generally more hydrophilic than the native high molecular weight material, the susceptibility to moisture increasing with decrease in the molecular weight in the range given, and fewer carboxymethyl groups per anhydroglucopyranosidic unit may be introduced into the dextran to obtain an ether which, after conversion to the salt, has a given moisture pick-up and retention capacity.

The base reacted with the carboxymethyl ether also influences the hydrophilic characteristic of the powder. Thus, certain of the salts, such as the sodium and magnesium salts, are soluble in water and more highly hydrophilic or hygroscopic than other salts, whereas others of the salts, such as the calcium or strontium salts, are water-insoluble and relatively non-hydrophilic or non-hygroscopic. A powder of predetermined hydrophilic characteristics and moisture pick-up and retention capacity can be obtained by selection of the starting dextran, whether water-soluble or water-insoluble, the molecular weight thereof, the D.S. with respect to carboxymethyl groups, the base used to neutralize or partially neutralize the ether, and whether the resulting salt is a partial or complete salt.

Preferably, the dextran powder particles, which function as a carrier and adhesive or bonding agent for the active ingredient, consist essentially of a water-soluble salt of a carboxymethyl dextran derived from native, unhydrolyzed high molecular weight, water-soluble or water-insoluble dextran and containing an average of 2.0 to 3.0 carboxymethyl groups per anhydroglucopyranosidic unit, or a blend of such a water-soluble salt with a water-insoluble salt of the carboxymethyl dextran. The blends may comprise from 5% to 95% by weight of the water-soluble salt and, conversely, from 95% to 5% by weight of the water-insoluble salt, but preferably comprises from 25% to 75% of the water-soluble salt and from 75% to 25% of the water-insoluble salt. Dextran consisting of blends of 50% of the water-soluble salt and 50% of the water-insoluble salt are satisfactory for application to moist or weeping skin areas.

As an example of a particularly suitable dextran particle blend may be mentioned a blend of from 25% to 75% of the water-soluble magnesium salt of the carboxymethyl ether of native, unhydrolyzed high molecular weight L.m. B–512 dextran obtained by neutralization of the ether at pH 7.0, with 75% to 25% of the water-insoluble calcium salt of the carboxymethyl ether of native, unhydrolyzed high molecular weight L.m. B–512 dextran obtained by neutralization of the ether at pH 7.0. The water-insoluble nonhygroscopic calcium salt modifies the hydrophilic property of the water-soluble hygroscopic magnesium salt to a degree depending on the proportion thereof present in the blend. By varying the relative proportions of the salts, powders having varying moisture pick-up and retention capacities are provided. Other water-soluble and water-insoluble salts of ethers derived from dextrans and containing an average of 0.2 to 3.0 carboxymethyl groups per anhydroglucopyranosidic unit may be blended to obtain a fine powder of modified and controlled hydrophilic property. Also, while the acidic free ethers are generally not suitable as such for application to the skin because of the irritating effects, the ethers may be blended with partially or completely neutralized ethers to obtain modified dusting powder having an average particle size of 40 to 300 microns.

The following examples are given to illustrate specific embodiments of the invention, it being understood that these examples are not intended to be limitative.

*Example I*

To 32.4 gms. of native unhydrolyzed L.m. B–512 dextran there are added 125 mls. of water to form a solution. This solution is then admixed with a solution containing 163 gms. of sodium chloracetate dissolved in 125 mls. of water. There is thereafter added slowly to the resultant solution, 64 gms. of sodium hydroxide. The temperature increases during the addition to approximately 100° C. The mass is held at this elevated temperature for 30 minutes, then cooled to room temperature and poured into 500 mls. of methanol in which 10 gms. of penicillin (crystalline) has been dissolved. The mixture is vigorously stirred and filtered to recover a precipitate containing sodium carboxymethyl dextran carrying penicillin. The precipitate is dried at 50 mm. and 70° C. and reduced to a powder having an average particle size of 75 microns. The sodium carboxymethyl dextran provides an effective carrier for the penicillin and has the capacity to absorb up to 50% of its weight of moisture without the particles sticking together.

*Example II*

A sodium carboxymethyl dextran germicidal powder is prepared as described in Example I, with streptomycin being used in place of penicillin as the active ingredient.

*Example III*

A powder is formed of the dextran derivative as in Example I, with chloramphenicol being used as the active ingredient.

*Example IV*

A powder for pesticides is produced by preparing the carboxymethyl dextran salt as in Example I, and incorporating DDT therewith in a concentration of 0.1% by weight of the dextran salt.

*Example V*

In this example, the carboxymethyl dextran salt is made as described in Example I, but derived from NRRL B–523 native unhydrolyzed dextran is converted to the water-insoluble calcium salt which is ground in a micronizer and admixed with the active bactericidal ingredient to obtain a powder having an average particle size of 100 microns.

Example VI

In this example a blend by weight of 50% of finely divided starch and 50% particles of the sodium salt of carboxymethyl dextran is used as the carrier to which is incorporated streptomycin in the amount of 0.1% by weight of carrier particles.

The powdered carboxymethyl dextrans and the salts thereof which form the carrier and adhesive agent for the active ingredient remain in free-flowing mobile condition for indefinite periods of time when kept in closed containers.

Although the powder may consist of the carboxymethyl salts or mixtures of the salts with the free ethers, an important embodiment of the invention contemplates the use of the ethers and the salts, particularly the latter, in combination with other powders such as talc, mica, di-calcium phosphate, magnesium carbonate, the various forms of starch, and the like. More particularly, the invention contemplates modification and improvement in the mobility and capacity to absorb substantial amounts of moisture without agglomeration of starch powders and to accomplish this the powdered water-soluble or water-insoluble carboxymethyl dextran salts are blended in amounts of 5% to 65% by weight in any suitable mixing device with finely divided starch. As an example, when 50% by weight of the powdered sodium or magnesium salt of the carboxymethyl ether of native unhydrolyzed high molecular weight L.m. B–512 dextran containing an average of 2.0 to 3.0 carboxymethyl groups per anhydroglucopyranosidic unit is blended with 50% of starch powder having an average micron size of 40 to 300 microns, to obtain an intimate mixture of the two, the resulting powder has improved flow characteristics and mobility, and when applied to a moist or weeping body surface, has the capacity to absorb more moisture, up to 35% to 50% of its weight, without agglomerating or caking than a powder consisting essentially of the starch, and has improved shelf life in that it does not aggregate into lumps if exposed to ordinary atmospheric conditions. Blends of the ether salts with talc and other materials commonly used for body dusting purposes are also improved. The salts of any of the carboxymethyl dextrans of D.S. between 0.2 and 3.0 may be blended with the starch, talc or the like but at present the preferred salt for the blend is that resulting from partial or complete neutralization of the highly substituted (D.S. 2.0 to 3.0 ethers of native unhydrolyzed high molecular weight dextrans like L.m. B–512 or L.m. B–523 dextran.

Alkali metal and alkaline earth metal salts other than those specifically mentioned or exemplified are contemplated and are prepared in the usual way, by reacting the ether with an amount of the appropriate base sufficient to partially or completely neutralize the acidic ether, an excess of the base over the calculated amount being used, preferably when complete neutralization is desired.

In place of the active substances set forth above in the examples, there may be used various other antibiotics which are incorporated with the carboxyalkyl dextran to form the powder composition, for example, bacitracin, chlortetracycline, and oxytetracycline.

Other antibiotics which are harmless to humans but destroy disease-causing microorganisms may be used. The most important substances of this class are the antibiotics members of the group of soluble organic compounds that are produced by microorganisms and at low concentrations have the property of inhibiting the growth, activity or multiplication of other microorganisms.

Antibiotics for treatment of plant diseases are streptomycin and actidione is also used. 100–500 p.p.m. of streptomycin incorporated in the powder and applied to the bark prevents fire blight.

Where the powder composition is to be used for treating plant diseases the carboxymethyl dextran powder material is admixed thoroughly with an antibiotic such as streptomycin which may be used for treating trees and the like to protect the same from blight and other diseases. Instead of streptomycin there may be used actidione and such antibiotics are used preferably in a concentration of 100 to 500 parts per million.

In the use of the powder chemical composition as insecticide, the toxic or bactericidal or antibiotic is admixed with carboxymethyl dextran and there is added fillers such as clay, talc, lime (unhydrolyzed) and pyrophyllite.

Fumigants may also be prepared using aerosols for propelling the fine dust particles comprising the active ingredient out of containers. For this purpose compressed carbon dioxide or fluorides (e.g. Freon 12) may be used.

In addition, where insecticides are to be made containing inorganic toxic materials there may be used with the carboxymethyl dextran carrier the oxides of arsenic, calcium arsenates, Paris green (copper arsenate), similarly as in Example IV where the active ingredient is DDT.

The concentration of the active bactericidal or antibiotic ingredient used in each case depends upon the particular use of the powdered composition. For example, when the same is to be used on humans the concentration would be correspondingly lower than that on plants and domestic animals. The particle size of the active ingredients is preferably as fine or finer than the larger size particles of the carboxyalkyl dextran or its salt to provide a uniform dispersion of the active ingredient. For this purpose particles of the active ingredients having a size range from 10 to 250 microns are useful.

Since some change and variation may be made in details in the practice of the invention without departing from the spirit and scope of the disclosure and invention, it is to be understood that it is not intended to limit the invention except as defined in the appended claims.

What is claimed is:

1. A method of making a germicidal composition comprising sodium carboxymethyl dextran and an antibiotic comprising dissolving 32.4 grams of native unhydrolyzed L.m. B–512 dextran in 125 mls. of water to form a solution of the same, admixing in said solution 163 grams of sodium chloracetate dissolved in 125 mls. of water, thereafter adding to the resultant solution 64 grams of sodium hydroxide and cooling the reaction mixture to room temperature, then admixing therewith 500 mls. of methanol in which is dissolved a small but effective amount of an antibiotic selected from the group consisting of penicillin and streptomycin, filtering the resultant mass to recover a precipitate consisting of sodium carboxymethyl dextran and said antibiotic, and drying said precipitate and reducing the same to provide a germicidal powder.

2. A method of making a biochemical composition comprising sodium carboxymethyl dextran and penicillin comprising dissolving 32.4 grams of native unhydrolyzed L.m. B–512 dextran in 125 mls. of water to form a solution of the same, admixing in said solution 163 grams of sodium chloracetate dissolved in 125 mls. of water, thereafter adding to the resultant solution 64 grams of sodium hydroxide and cooling the reaction mixture to room temperature, then admixing therewith 500 mls. of methanol in which is dissolved 10 grams of pencillin, filtering the resultant mass to recover a precipitate consisting of sodium carboxymethyl dextran and pencillin, and drying said precipitate and reducing the same to a powder.

3. A method of making a biochemical composition comprising sodium carboxymethyl dextran and streptomycin comprising dissolving 32.4 grams of native unhydrolyzed L.m. B–512 dextran in 125 mls. of water to form a solution of the same, admixing in said solution 163 grams of sodium chloracetate dissolved in 125 mls. of water, thereafter adding to the resultant solution 64 grams of sodium hydroxide and cooling the reaction mixture to room temperature, then admixing therewith 500 mls. of methanol in which is dissolved 10 grams of streptomycin, filtering the resultant mass to recover a precipitate consisting of sodium carboxymethyl dextran and streptomycin and drying said precipitate and reducing the same to a powder.

References Cited in the file of this patent

UNITED STATES PATENTS

| | | |
|---|---|---|
| 2,731,386 | Reiner | Jan. 17, 1956 |
| 2,742,395 | Hodge et al. | Apr. 17, 1956 |
| 2,876,165 | Novak | Mar. 3, 1959 |